United States Patent [19]

Keene

[11] Patent Number: 4,651,565

[45] Date of Patent: Mar. 24, 1987

[54] ELECTROMAGNETIC GYROSCOPE

[75] Inventor: Donald W. Keene, Roslindale, Mass.

[73] Assignee: The Charles Stark Draper Laboratory, Inc., Cambridge, Mass.

[21] Appl. No.: 627,847

[22] Filed: Jul. 5, 1984

[51] Int. Cl.$^4$ .............................................. G01N 3/46
[52] U.S. Cl. ...................................... 73/505; 73/518; 324/160
[58] Field of Search .......................... 73/505, 518, 519; 324/160, 173, 174

[56] References Cited

U.S. PATENT DOCUMENTS

| 1,249,530 | 12/1917 | Smith et al. | |
|---|---|---|---|
| 1,533,683 | 4/1925 | Abbot | |
| 2,315,216 | 3/1943 | Moller et al. | |
| 2,562,690 | 7/1951 | Becker | |
| 3,020,527 | 2/1962 | MacLaren | |
| 3,228,628 | 1/1966 | Chubb | |
| 3,777,255 | 12/1973 | Young et al. | |
| 4,114,451 | 9/1978 | Crittenden et al. | 73/504 |
| 4,114,452 | 9/1978 | Bitson | 73/504 |

OTHER PUBLICATIONS

Kennard, E. H., "Unipolar Induction", Phil. Mag. (Jun. 1912), pp. 937-941.
Barnett, S. J., "On Electromagnetic Induction and Relative Motion", The Physical Review, vol. 35, No. 5 (Nov. 1912), pp. 324-336.
Kennard, E. H., "The Effect of Dielectrics on Unipolar Induction", The Physical Review, vol. 1, No. 5 (2nd Series, May 1913), pp. 355-359.
Kennard, E. H., "On Unipolar Induction . . . ", Phil. Mag. (Feb. 1917), pp. 179-190.
Pegram, G. B., "Unipolar Induction and Electron Theory", The Physical Review, vol. 10, No. 6 (2nd Series, Dec. 1917), pp. 591-600.
Barnett, S. J., "On Electromagnetic Induction and Relative Motion—II", The Physical Review, vol. 12, No. 2 (2nd Series, Aug. 1918), pp. 95-114.
Panofsky, W. K. H., Classical Electricity and Magnetism (1962 Addison-Wesley), pp. 336-339.
Miller, A. I., Albert Einstein's Special Theory of Relativity (1981, Addison-Wesley), pp. 285-299.

Primary Examiner—Stewart J. Levy
Assistant Examiner—John E. Chapman, Jr.
Attorney, Agent, or Firm—Lahive & Cockfield

[57] ABSTRACT

An electromagnetic gyroscope, having a sensing axis about which inertial angular rates are measured, the gyroscope including a magnet for generating a magnetic field parallel to the axis; a conductive path traversing the magnetic field; and a sensor for sensing a potential difference between a first point and a second point on the conductive path.

19 Claims, 18 Drawing Figures

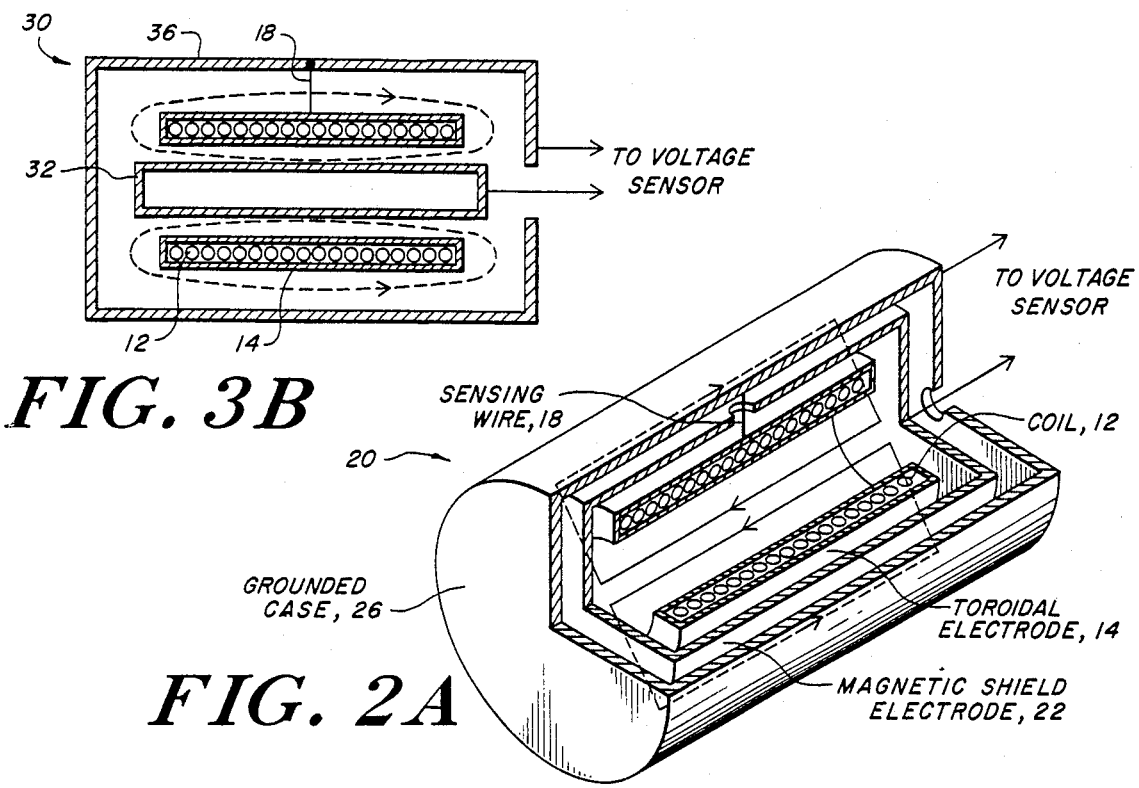
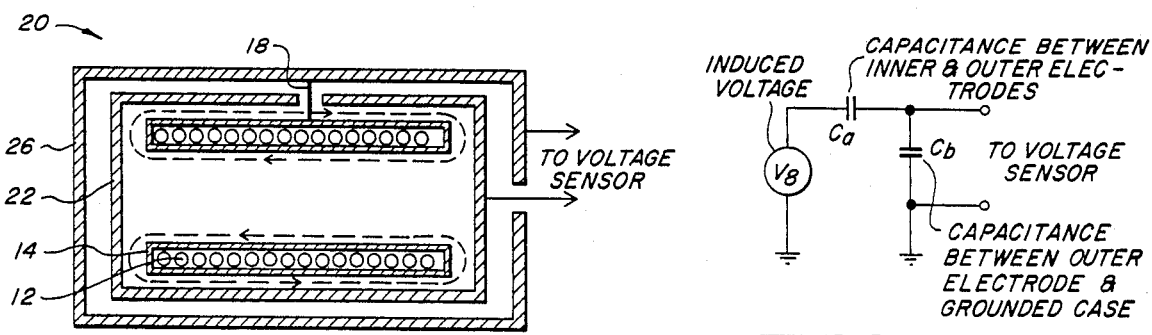
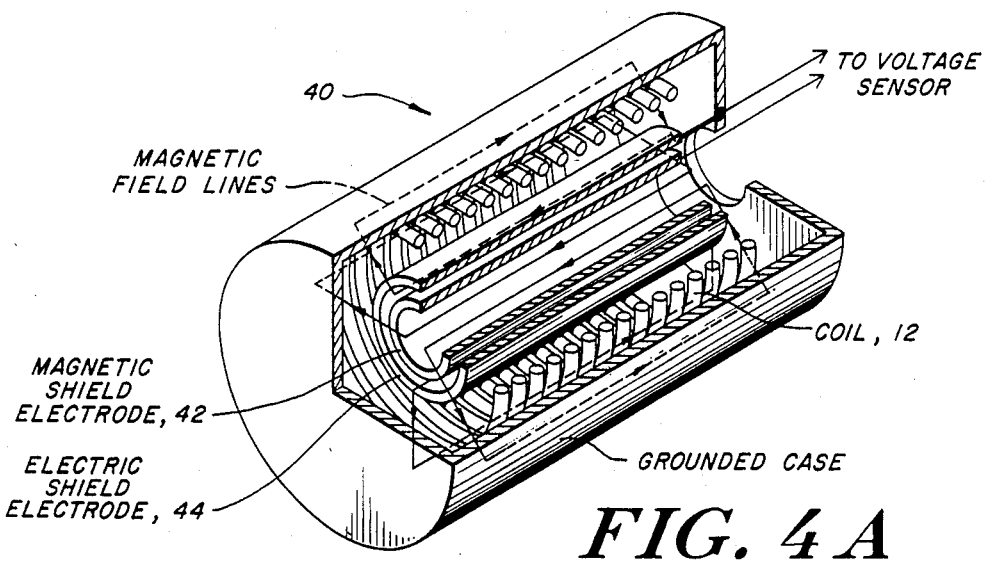

ELECTROMAGNETIC GYROSCOPE

BACKGROUND OF THE INVENTION

This invention relates to inertial angular rate sensors and, in particular, to electromagnetic gyroscopes.

Gyroscopes provide a measure of an angular rate (velocities and differential or integral functions of velocity) impressed upon the gyroscope by producing a signal representative of the torques experienced by the instrument at any particular time. Typical prior art gyroscopes make use of rotating elements suspended by complex gimbal assemblies. The inertial torques impressed upon these instruments typically are measured by rebalance feedback loops.

These prior art devices suffer from the number of moving parts involved, the delicate nature of the structures, and difficulty in manufacturing. There exists a need for better gyroscopes, suitable for robust service in adverse environments. In particular, reliable gyroscopes which can fit into small volumes and perform without moving parts would satisfy a variety of long-felt needs in aeronautic and related industries.

SUMMARY OF THE INVENTION

The electromagnetic gyroscope of the present invention is a device for measuring an inertial angular rate based on the inertial properties of an electromagnetic field. The present invention contains no moving parts but produces an output voltage when it rotates relative to inertial space.

The operation of the present invention is based upon the principle that a conductive path traversing a magnetic field will generate an electric potential difference between two points on the path when the path rotates about an (sensing) axis relative to the inertial reference frame. To sense rotation about the axis, the two points on the path need only define a capacitance sufficient to drive a sensing circuit.

Conceptually, the principle of operation can be understood by considering a permanent magnet surrounded by two concentric metal cylinders coaxial with the magnetic field axis and where the cylinders are connected through a voltmeter by a radially extending wire which passes through the axial field. Upon rotation of the cylinders together about their common axis, electrons in the wire experience a radial force proportional to the product of the magnetic field and the angular velocity. In response to that force, a net flow of electrons takes place from one cylinder to the other, resulting in a potential difference between the cylinders. Since rotating the magnet about its axis does not change the magnetic field, the potential difference, or voltage between the cylinders, resulting from the electron flow is generated solely by the inertial rotation of the cylinders and wire in the magnetic field, and not as a result of any relative motion of the magnet and cylinders. Hence, the voltage between the cylinders or the charge on the cylinders is a direct measure of the inertial angular velocity of the cylinders.

In order to measure the induced voltage, the radial wire need not be connected directly to the outer plate but instead can be connected to one terminal of a voltmeter. The other terminal of the voltmeter is connected by a wire to the outer cylinder. For the case of an infinite input impedance voltmeter, the voltage reading is directly related to the inertial angular rate of the assembly.

Since practical voltage measuring devices will have a finite impedance, preferred embodiments of the electromagnetic gyroscope will, in most instances, employ an electromagnet excited by an alternating current waveform rather than a permanent magnet to accurately measure angular velocities.

In one simple embodiment, the gyroscope consists basically of an electromagnet (including a cylindrical coil extending about an axis of symmetry and an associated power supply) housed in a grounded cylindrical metal case which extends along the coil axis. In this configuration, the grounded case acts as an outer cylindrical electrode and a second casing surrounding the coil acts as an inner cylindrical electrode. The electromagnet produces a magnetic field having an axial component passing between the outer electrode and the inner electrode and having an oppositely directed axial component within the coil. A wire is connected to the inner electrode and passes radially through the field between the electrodes and then out a hole in the outer electrode to one terminal of a voltage sensor. The other terminal of the sensor is connected to the box.

In operation, as this assembly is rotated about the axis of symmetry, electrons in the radially extending part of the wire which intercepts the magnetic field experience a magnetic force which tends to draw charge from the coil shield, through the voltmeter to the outer electrode. The open circuit voltage is given approximately by:

$$V = \int_{r_a}^{r_b} (\bar{\Omega} \times \bar{r}) \times \bar{B} \cdot d\bar{r}$$

where V is the line integral of the induced electric field intensity $(\bar{u} \times \bar{B})$ along the radially extending part of the wire, $r_a$ is the radius of the inner electrode, $r_b$ is the radius of the outer electrode, $\bar{\Omega}$ is the vector angular velocity of the assembly, and $\bar{B}$ is the magnetic field vector.

Between the two electrodes, the magnetic field is approximately uniform, and for an AC excited solenoid operating at frequency $\omega_o$, $$\bar{B} = (B_o \sin \omega_o t) \hat{i}_z$$

where $B_o$ is a constant and $\hat{i}_z$ is a unit vector in the direction of the coil axis, and, for the geometry described $$\bar{\Omega} = \Omega_o \hat{i}_z$$

where $\Omega_o$ is the magnitude of the angular velocity along the sensing axis.

Hence, if any shunting capacitance between the radial wire and the outer electrode is ignored, the voltage measured at the voltmeter is related to the angular rate of the gyroscope as follows:

$$V = \Omega_o \frac{H}{C^2 \epsilon} \frac{(r_b^2 - r_a^2)}{2} \sin \omega_o t$$

where H is the magnetic field intensity, C is the speed of light and $\epsilon$ is the dielectric constant for the material occupying the space between the electrodes.

One problem with the simple embodiment described above lies in the need to isolate the currents in the coil, itself, from the currents induced in the sensing wire during rotation through the axial field. In some applications an internal battery power supply and electronic current regulator can be employed within the coil of the gyroscope; however, in most instances (particularly in extended use applications) the coil is driven preferably by an external power supply. In these instances, the power supply can be separated from the coil by an isolation transformer or the gyroscope can be isolated from the coil.

Thus, in another embodiment, the gyroscope can consist of an inner coil with a remote power supply surrounded in part or in whole by conductive electric shield which serves as the inner electrode. In this embodiment, the inner electrode acts as an electric shield because it isolates the sensed gyroscope voltage from the coil voltage. Surrounding this electric shield subassembly is a cylindrical conductive element which serves as an outer electrode and a magnetic shield. The purpose of the magnetic shield is to confine the field primarily to a region inside the outer electrode. The entire assembly can then be surrounded by a grounded, conductive casing. In this embodiment, the roles of the inner and outer electrodes are reversed because the inner electrode is grounded rather than the outer electrode. The inner electrode is connected to ground by a wire which passes radially through the magnetic shield. As the entire assembly rotates in inertial space, axial magnetic field components interact with charge carriers in the radially extending wire to cause charge transport between the inner electrode and the case, resulting in a change in electric potential on the outer electrode. A voltage sensor, measuring the electric potential between the outer electrode and the grounded case, provides a signal proportional to the angular rate. In this configuration the power supply need not be isolated from ground.

A number of variations on the inner electrode (electric shield) and outer electrode (magnetic shield) design can be implemented. The inner electrode may be cylindrical and, thus, encase the coil and its axial flux path or the inner electrode can be toroidal in shape and encase only the coil, leaving a hollow center. In either alternative the electric shield should be designed so that the magnetic flux can pass through the gyroscope unimpeded. This can be accomplished by segmenting the inner electrode into separate pieces, by providing openings in the end walls, or by employing thin end walls in conjunction with segmentation.

Another variation of the gyroscope design can be implemented by an electromagnetic coil (again, with a remote power supply) surrounded by a toroidal electric shield which serves as one sensing electrode as described in the paragraphs above. However, in this variation, a conductive tube or rod placed inside the coil acts as the outer electrode to establish the second electrode for measurement of induced voltage.

In one preferred embodiment, the second electrode can be a hollow, central tube split along its length. In this design, the amplifier or a portion thereof can be located inside this hollow central electrode to minimize shunting capacitances. The entire assembly can be encased by a grounded casing. A wire traverses the axial magnetic field from the toroidal electric shield to the casing and the potential difference induced by rotation can be measured by a voltage sensor connected between the grounded casing and the electrode formed by the inner tube. An advantage of this embodiment is that at the capacitance between the tubular electrode and the case is minimized thereby increasing the sensitivity.

In yet another embodiment, the gyroscope can consist of an inner cylindrical electrode and an outer cylindrical electrode, which are coaxial and both of which are surrounded by a coaxial coil. This embodiment can be considered a variation of the tubular electrode within a toroidal (coil-encasing) electrode design wherein the outer surface of toroidal electrode has been removed thus leaving two concentric cylinders within the coil. The coil is driven to produce a magnetic field having an axial component passing between the two cylindrical electrodes. Again, one electrode is grounded and a wire connects the other electrode to one terminal of a voltage sensor. The other terminal of the sensor is grounded. In the operation of this embodiment, current flows through the sensor in one direction or the other depending upon the direction of rotation of the device about its sensing axis. The magnitude of the potential difference is a measure of the angular rate about the axis of the cylinders.

The invention will next be described in connection with a variety of illustrated embodiments; however, it should be clear that various changes and modifications can be made by those skilled in the art without departing from the spirit or scope of the claims. For example, although connecting wires are shown in drawings joining the electrodes of the various gyroscope components to each other, to ground or to a voltmeter to measure the voltage difference, skilled artisans in the field can devise numerous other methods for electrical connection or charge transfer. It should be noted that the potential difference is measured preferably by grounding one or the other electrode. With an external grounded power supply it is preferred that the inner (electric shield) electrode be grounded. The essential components of the invention are the conductive path traversing the magnetic field and a sensor for detecting a potential difference between two points on the path.

Although cylindrical electrodes are shown in the illustrations below, connected in one fashion or another to form a capacitive plate, other geometries, such as conical, semicircular, spherical, or elliptical shaped electrodes may also be employed. In general, the two electrodes need only conform roughly to an inner and an outer flux surface. Various dielectric materials can be employed between the two electrodes. Additionally, it is within the skill of practitioners in this field to design various power supplies, both internal and external, for the electromagnetic coil elements of this invention. Moreover, although electromagnetic coils excited by alternating currents are preferred in the illustrated embodiments, other current waveforms or even permanent magnets may be preferred for particular applications. For example, a permanent magnet or D.C. field can be preferred for measuring angular accelerations.

In the illustrations that follow, the terms "inner electrode" and "outer electrode" are used to describe a number of different components. The term "inner" means the electrode is inside the magnetic field, i.e., next to the coil. The term "outer" means outside the magnetic field. Thus, for the example of a tubular electrode within a toroidal (coil-encasing) electrode, the central tube is considered the outer electrode even though it is in the middle of the coil. The inner electrodes are designed to allow unimpeded passage of a magnetic field. Conversely, in some embodiments the outer electrodes also block the passage of the magnetic field for improved sensitivity. The inner electrode should also provide an equipotential surface insensitive to the voltage drop across the coil; hence in the description below, the inner electrode is also sometimes referred to as an electric shield electrode.

BRIEF DESCRIPTION OF THE FIGURES

FIG. 1b is a cross-sectional side view of the gyroscope of FIG. 1a; and FIG. 1c is an equivalent circuit for the gyroscope of FIG. 1a.

FIG. 2a is a schematic, partially cut-away, perspective view of a second embodiment of the electromagnetic gyroscope. FIG. 2b is a cross-sectional, side view of the gyroscope of FIG. 2a. FIG. 2c is an equivalent circuit for the gyroscope of FIG. 2a.

FIG. 3b is a cross-sectional, side view of the gyroscope of FIG. 3a.

FIG. 4a is a schematic, partially cut-away, perspective view of a fourth embodiment of the electromagnetic gyroscope. FIG. 4b is a cross-sectional side view of the gyroscope of FIG. 4a.

FIG. 5b is an equivalent circuit for the gyroscope of FIG. 5a.

DETAILED DESCRIPTION OF THE PREFERRED EMBODIMENTS

Figure 1A:
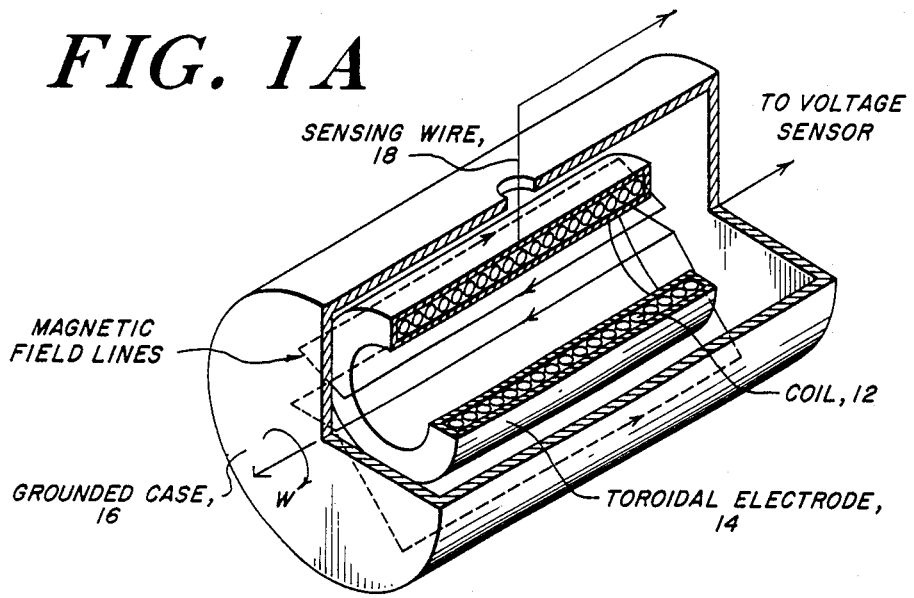
FIG. 1a is a schematic, partially cut-away, perspective view of one embodiment of the electromagnetic gyroscope.
Figure 1B:
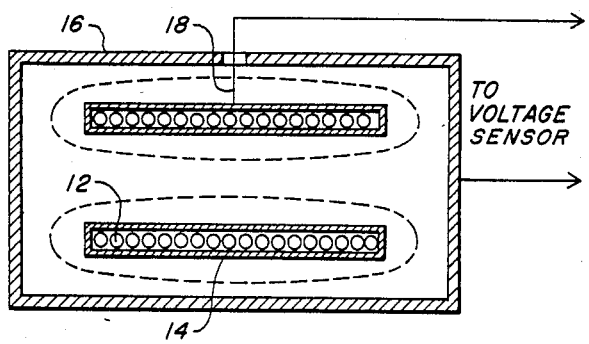
Figure 1C:
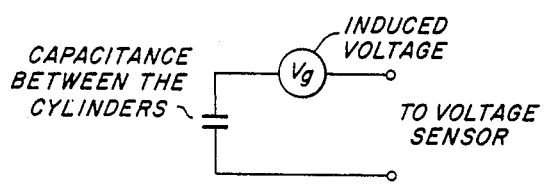

In FIGS. 1a and 1b, one embodiment of the electromagnetic gyroscope 10 most useful with an internal power supply is shown having an inner cylindrical coil 12, surrounded by a toroidal electrode 14. Surrounding coil 12 and electrode 14 is an electrically conductive casing 16 which is grounded. A wire 18 is connected to the electrode 14 and passes radially through the field between the coil 12 and the casing 16 and then out through a hole in the casing 16 to a voltage sensor (not shown). In this embodiment, it should be appreciated that the power supply for the coil 12 is isolated. The toroidal electrode serves as an inner electrode and the casing serves as an outer electrode, connected by the voltage sensor. One terminal of the sensor is connected to the radial wire and the other terminal of the sensor may be grounded to casing 18. An equivalent circuit for this embodiment is shown in FIG. 1c.

In FIGS. 2a and 2b another embodiment of the electromagnetic gyroscope 20 is shown having an inner coil 12 for generating a magnetic field, a toroidal electrode 14 surrounding the coil 12, a magnetic shield electrode 22, and a grounded case 26. In this embodiment, a sensing wire 18 connects the toroidal electrode 14 with the grounded case 26. An external power supply (not shown) can be used to excite the coil. The magnetic shield electrode 22 preferably of a conductive material, such as copper, serves to constrain the magnetic field to the volume inside itself, at high frequencies due to induced surface currents on this shield thus increasing the field strength between the toroidal electrode 14 and the shield electrode 22. Since the toroidal electrode 14 is grounded by connecting wire 18, a voltage sensing means (not shown) connecting the magnetic shield electrode 22 and the case 26 yields a voltage related to the angular rate. An equivalent circuit for this embodiment is shown in FIG. 2c.

Figure 3A:
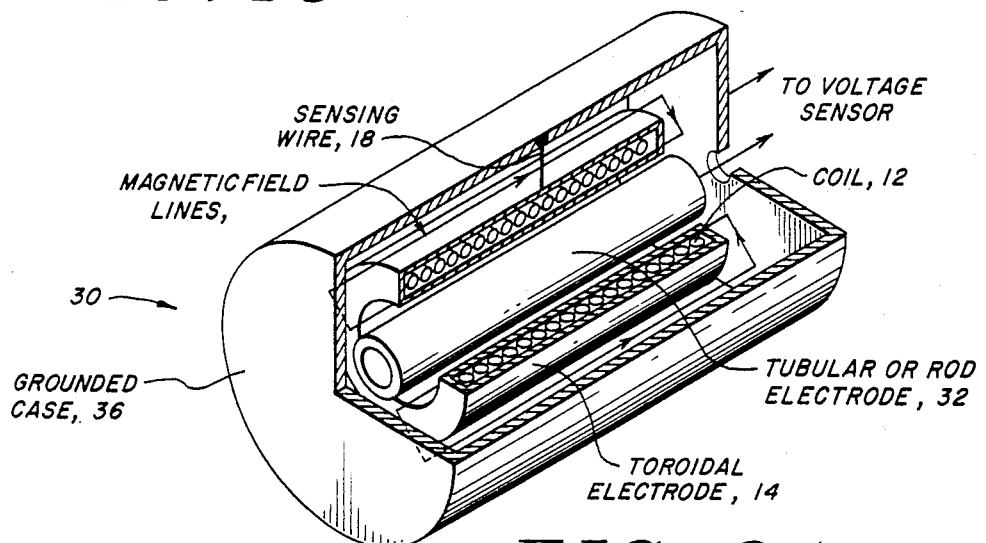
FIG. 3a is a schematic, partially cut-away, perspective view of a third embodiment of the electromagnetic gyroscope.

In FIGS. 3a and 3b a third embodiment of the electromagnetic gyroscope 30 is shown having an electromagnetic coil 12 surrounded by a toroidal electrode 14, which, in turn, is surrounded by a grounded case 36. Disposed in the center of the device is a tube or rod electrode 32. In operation, the tube electrode 32 serves a function similar to that of the magnetic shield cylinder 22 shown in FIGS. 2a and 2b. The grounded case 36 serves as a magnetic and electric shield on the outside. The coil may again be energized by a remote power supply through an isolation transformer in a manner similar to that described above in connection with FIG. 2. A connecting wire 18 likewise joins the toroidal electrode 14 to the grounded case 36 and a voltage sensing means (not shown) is connected between the central tube electrode 32 and the grounded case 36 to measure the angular rate.

Figure 4B:
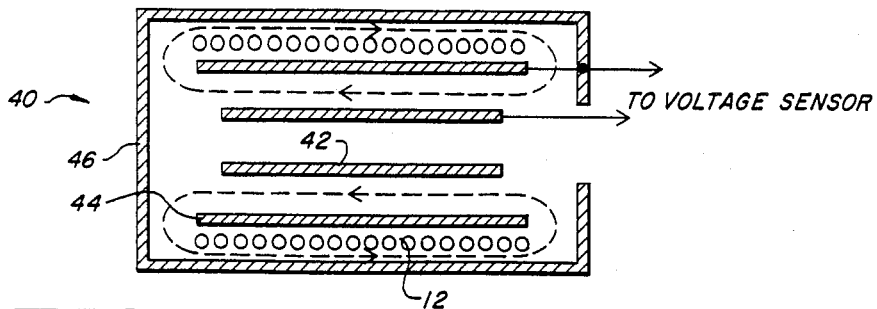

In FIGS. 4a and 4b a fourth embodiment of the electromagnetic gyroscope 40 is shown having a coil 12 and two electrodes, both of which are disposed within the coil 12. A grounded case 46 serves to shield out external electrical and magnetic fields and can in some instances also constrain the internal magnetic field. The coil 12 may be energized in a fashion similar to that described above. The electric shield electrode 44 is connected to the case 46 by sensing wire 18. One terminal of the voltage sensor (not shown) is connected to the grounded case while the other sensor terminal is connected to the central or "outer" electrode 42 to obtain a measurement of the angular rate when the device 40 is energized and rotated.

It should be noted that in the embodiment of FIGS. 4a and 4b, the sensing wire 18 traverses the field at the end of the gyroscope in a direction parallel to the axis while in the earlier shown embodiments, the sensing wire traverses the field radially and perpendicular to the axis. For the case of a solenoidal field, such as that generated by coil 12 in FIGS. 4a and 4b, the magnetic field will have axial symmetry and any path across the field lines will induce the same gyroscope voltage.

The equivalent circuits for the embodiments of FIGS. 3a–b, and 4a–b are similar to that shown in FIG. 2c, except that $C_b$ (the capacitance between the magnetic shield and the grounded case) will be reduced as a result of the geometry.

Figure 5A:
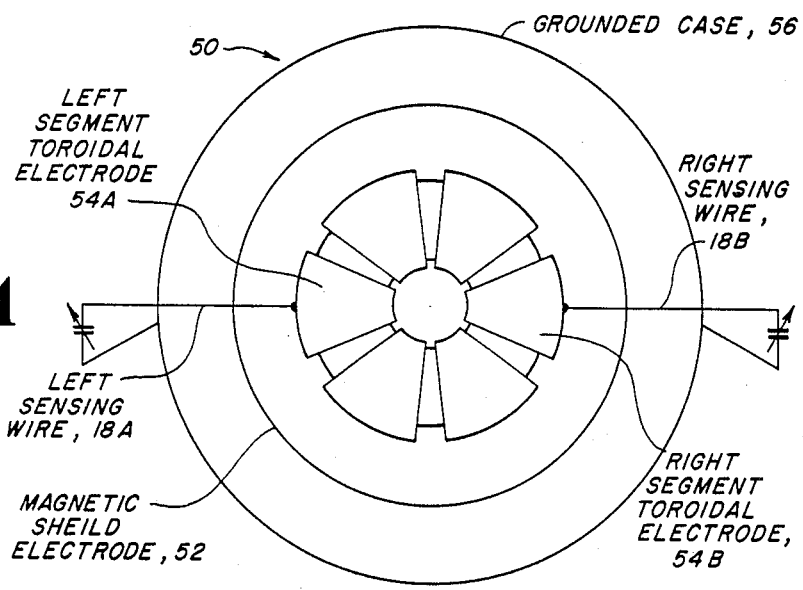
FIG. 5a is an end view of a variation on the embodiment of FIGS. 2a–2c.

In FIG. 5a, a modification of a gyroscope 50 similar to that shown in FIG. 2 is presented wherein the toroidal electrode is divided into a left segment 54a and a right segment 54b. The electrode is also split so that the magnetic flux passes through unimpeded at high frequencies. The purpose of the two segments is to permit electrical balancing of the gyroscope in use. As can be seen in this end view of the gyroscope in FIG. 5a, the toroidal electrode segments 54a, 54b are also split into wedge-shaped strips to reduce eddy currents and allow passage of the magnetic field at the ends of the electrode. Ideally, the impedances of the left and right segments 54a, 54b should be balanced so that no net voltage (except for the gyroscope potential) is detected. As a practical matter, balancing the circuit is difficult and a means for mechanically or electrically trimming the circuit should be provided.

Figure 5B:
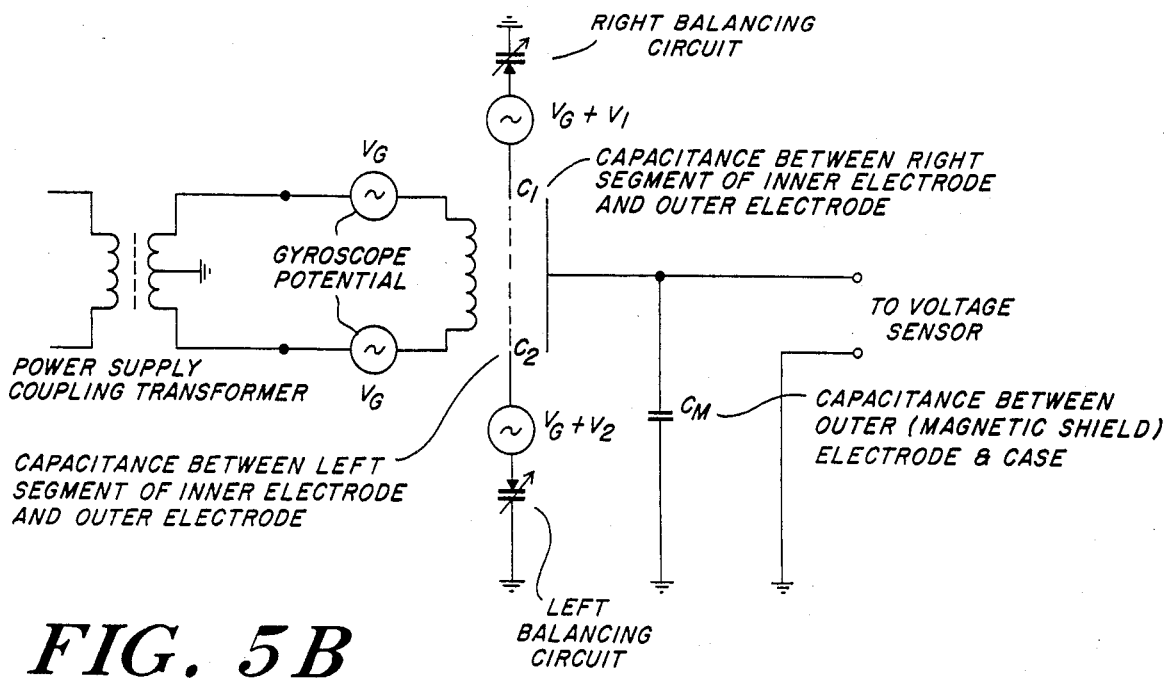
Figure 5C:
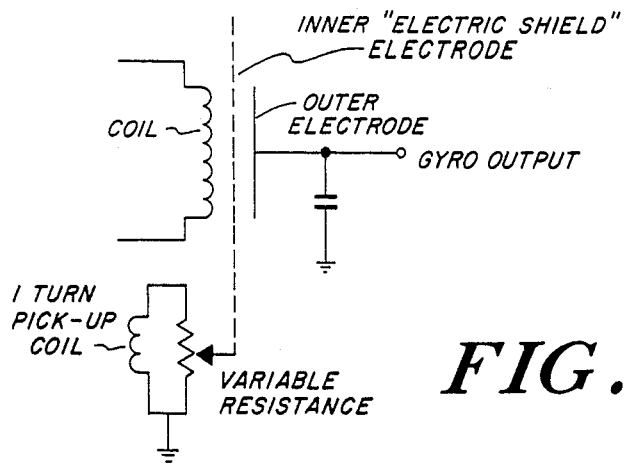
FIG. 5c shows an alternative triming circuit.

Thus, in FIG. 5b, azimuthal asymmetries are overcome by separately grounding each segment through an adjustable impedance. As shown in this schematic diagram $V_1$ and $V_2$ represent unwanted induced voltages arising from coil coupling. The ground lead connection for each electrode is preferably offset from the midpoint of each electrode to provide a suitable adjustment range. In FIG. 5c, an alternate triming circuit is shown schematically. A single segment electric shield electrode, preferably split along the axis, may be used with the trimming circuit of 5c. In this design, a small pick-up coil generates a bucking voltage which is trimmed to adjust for asymmetries. Alternatively, a mechanical tuning system can be designed wherein the magnetic and electric shields are rotated with respect to each other until azimuthal asymmetries are cancelled.

Figure 6:
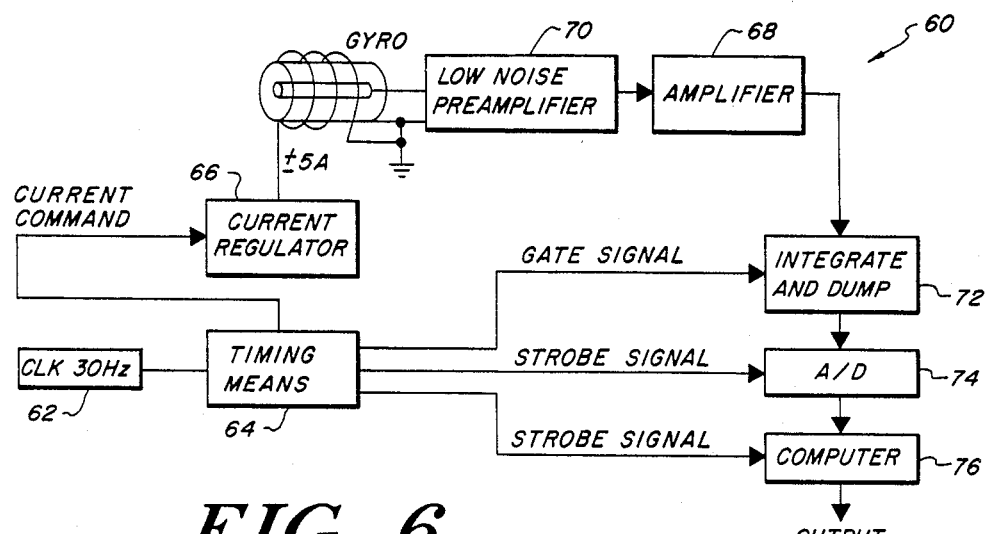
FIG. 6 is an overall block diagram of a control and sensing circuitry of the electromagnetic gyroscope.

FIG. 6 shows a schematic diagram of an exemplary embodiment of a voltage sensor 60 for use with any of the above gyroscope configuations. As shown, the voltage sensor includes a 30 Hz clock generator 62, timing means 64, current regulator 66, preamplifier 70, amplifier 68, integrate and dump network 72, analog-to-digital (A/D) convertor network 74 and computer 76.

The clock generator (or clock) 62 generates a train of pulses which are received by the timing means 64 and used to generate control signals for network 72 and 74 and computer 76. The timing means 64 also generates a command signal for application to the current regulator 66. In response the current command signal, regulator 66 generates an excitation current waveform for exciting the gyroscope coil.

As further shown in FIG. 6, a potential difference between the two gyroscope electrodes is sensed in the preamplifier 80 and the resultant difference signal is further amplified in amplifier 68. The amplified signal from the gyroscope is then averaged in an integration and dump circuit 72 which is gated by signals from the timing means 64. The resulting, averaged signal which represents the angular rate of the gyroscope is then converted from analog to digital form in converter 74, which also is clocked by the timing means 64. Finally, the digital results may be processed by a computer 76, in response to the strobe signal from the timing means 64. The output of the computer may be displayed or transmitted to other control systems to correct or otherwise respond to the measured angular rate.

Figure 7:
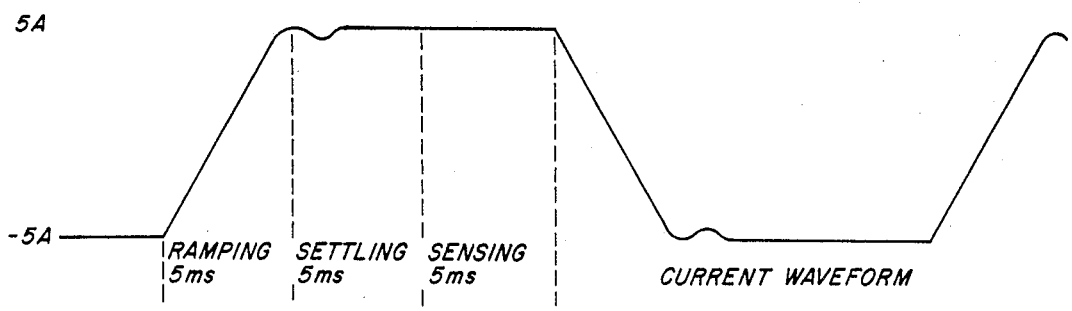
FIG. 7 is a graph depicting one embodiment of an ac current waveform useful in driving an excitation coil in an electromagnetic gyroscope.

FIG. 7 shows one preferred current waveform for exciting the coil of the gyroscopes of the illustrated embodiments. The waveform of FIG. 7 is a modified trapezoidal wave having a ramping period, a settling period and period of stable excitation during which the voltage means performs the sensing functions. Signals received from the gyroscope during this sensing period (which is approximately 5 milliseconds in the illustrated embodiment) are manipulated by the voltage sensing means as described above in connection with FIG. 6. Of course, it may be preferred in practical devices to use higher frequency current waveforms and, in some instances, a sinusoidal wave rather than a trapezoidal wave may be preferred.

Figure 8:
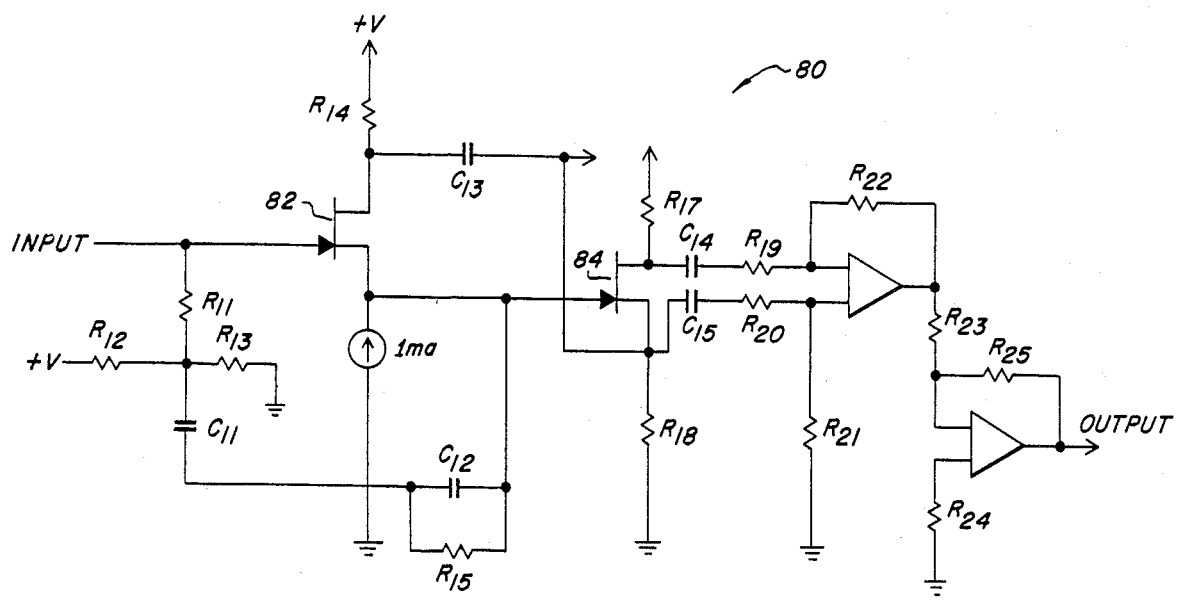
FIG. 8 is a circuit diagram of one embodiment of the preamplifier and amplifier of FIG. 6.

In FIG. 8 the circuitry for a combined preamplifier-amplifier 80 is shown. In the preamplifier section, junction field effect transistors 82 and 84 are employed in a bootstrap circuit. The resistances and capacitances of the elements shown in FIG. 8 will vary with the particular embodiment and excitation waveform chosen. However, for the purposes of an exemplary gyroscope design having a 19 picofarads capacitance and providing a 100 microvolt signal at the input, the following values were found satisfactory for the resistive and capacitive elements shown in FIG. 8: R11=2 Gigaohms, R12=250 M ohms, R13=100 M ohms, R14=10 K ohms, R15=130 K ohms, R17=3 K ohms, R18=4.5 K ohms, R19=100 K ohms, R20=100 K ohms, R21=1 M ohms, R22=1 M ohms, R23=1 K ohms, R24=1 K ohms, R25=100 K ohms, C11=20 microfarads, C12=4.7 microfarads, C13=4.7 microfarads, C14=1.5 microfarads, C15=6.0 microfarads.

In this design, transistor 82 and resistor R11 can be deployed inside the gyroscope to avoid feed-through capacitances. Of course, not only may the values of the resistive and capacitive elements vary with the design chosen, those skilled in the art can also devise various configurations for a preamplifier equivalent to that shown in FIG. 8a.

Figure 9:
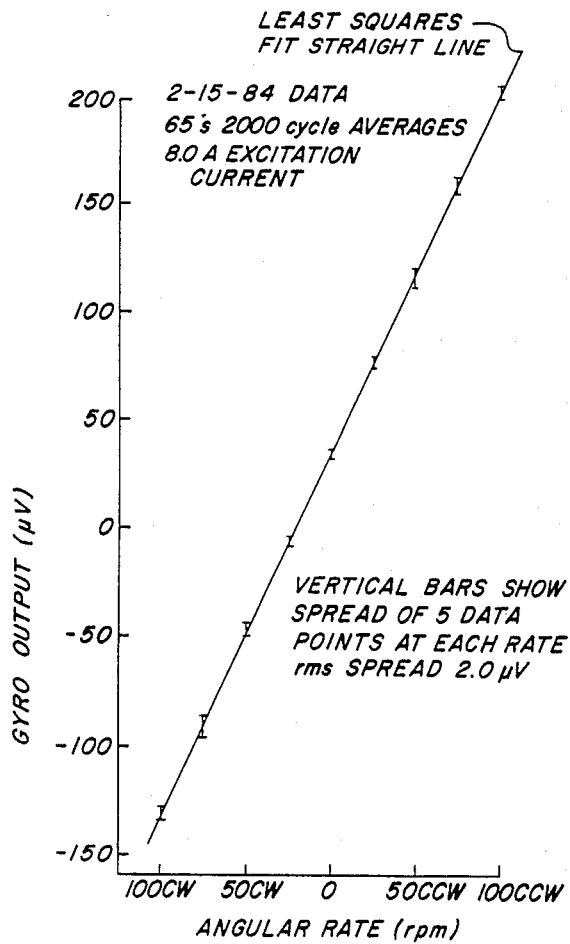
FIG. 9 is a graph of output voltage versus angular rate for an exemplary electromagnetic gyroscope built according to the teachings of the present invention.
Figure 10:
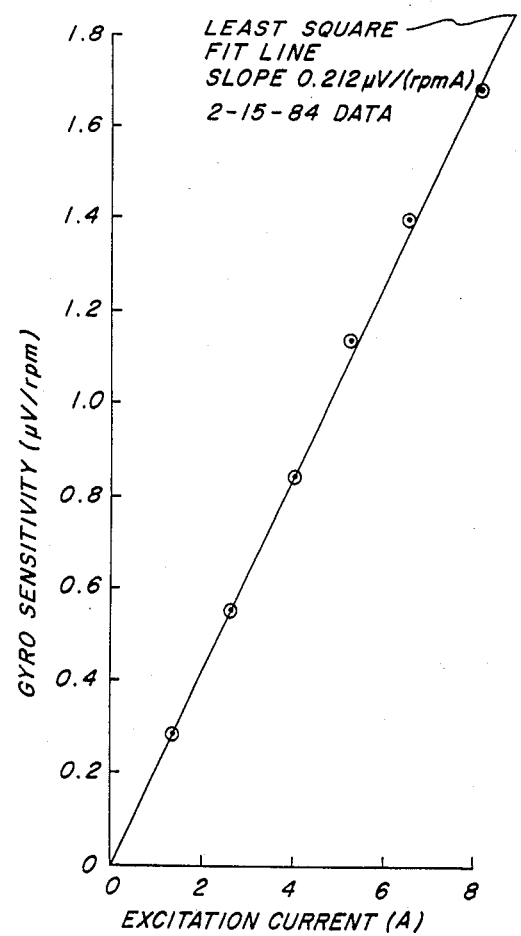
FIG. 10 is a graph of sensitivity versus excitation current for an exemplary electromagnetic gyroscope built according to the teachings of the present invention.

In FIGS. 9 and 10, the results of experiments on an exemplary electromagnetic gyroscope of the design generally shown in FIGS. 4a and 4b are presented. The coil was approximately 10 centimeters long and 13 centimeters in diameter. The magnetic field generated by the coil was approximately 16,000 amp turns per meter and had an inductance of 30 millihenrys and a resistance of 2 ohms. The coil dissipated approximately 40 watts of power. The current waveform used in the prototype experiments was similar to that shown in FIG. 7, the frequency was 30 hertz, the peak voltage was 65 volts and the current regulator had a bandwidth of approximately 150 Hertz. As can be seen in FIG. 9, the gyroscope demonstrated an output proportional to the angular rate over a wide range of rates. Moreover, as shown in FIG. 10, the gyroscope's sensitivity was proportional to the excitation current.

The electromagnetic gyroscopes described above are believed to represent substantial advances in the measurement of angular rates and should find wide application in the field. Additions, substractions, and modifications of the basic principles presented here will be apparent to those skilled in the art.

I claim:

1. An electromagnetic gyroscope, having a sensing axis about which axis inertial angular rates are measured, the gyroscope comprising:
   A. magnetic means for generating a magnetic field having a component parallel to said axis;
   B. a first electrode and a second electrode, said electrodes varying in radial distance from said axis and capable of defining an electric capacitance therebetween; and
   C. sensor means for sensing a potential difference between said first and second electrodes during rotation of the gyroscope.

2. The gyroscope of claim 1 wherein said first electorde lies along said axis.

3. The gyroscope of claim 1 wherein said first electrode and second electrodes are disposed concentrically about said axis.

4. The gyroscope of claim 3 wherein said first and second electrodes comprise concentric cylinders.

5. The gyroscope of claim 3 wherein the second electrode further comprises an electromagnetic shield confining said magnetic field to render it parallel to said axis.

6. The gyroscope of claim 5 wherein said shield is grounded.

7. The gyroscope of claim 1 wherein said magnet means is an electromagnetic means and further comprises an electric coil situated around said axis and a means for exciting the coil to generate said magnetic field.

8. The gyroscope of claim 7 wherein the coil is an air core solenoid.

9. The gyroscope of claim 7 wherein the exciting means is alternating current.

10. The gyroscope of claim 1 wherein the sensing means further comprises a means for grounding one of said electrodes, and a voltmeter connected between said other electrode and ground.

11. The gyroscope of claim 10 wherein the sensing means further comprises an amplifying means connected between said other electrode and said voltmeter.

12. The gyroscope of claim 1 wherein said magnet means comprises an electric coil situated around said axis and a means for exciting said coil to generate said magnetic field, and further wherein said first and second electrode surround said axis and at least one electrode being toroidal and surrounding said electric coil.

13. The gyroscope of claim 12 wherein said toroidal electrode is said first electrode.

14. The gyroscope of claim 12 wherein said toroidal electrode is said second electrode.

15. The gyroscope of claim 12 wherein said toroidal electrode is split into a plurality of sections.

16. The gyroscope of claim 12 wherein said toroidal electrode further comprises a means for permitting passage of said magnetic field generated by said surrounded electric coil.

17. The gyroscope of claim 1 wherein said magnet means comprises an electric coil situated around said axis and a means for exciting said coil to generate said magnetic field, and further wherein said first and second electrodes are concentric with, and surrounded by, said coil.

18. The gyroscope of claim 17 wherein the first electrode lies along said axis.

19. The gyroscope of claim 1 wherein said magnet means comprises an electric coil situated around said axis and a means for exciting said coil to generate said magnetic field, and further wherein said first and second electrodes are also concentric with, and surround said coil.

* * * * *